No. 642,969. Patented Feb. 6, 1900.
P. ELLIS & A. A. WHITELAW.
MACHINE FOR MEASURING OR LAYING OUT SLIDE VALVES.
(Application filed May 5, 1899.)
(No Model.)
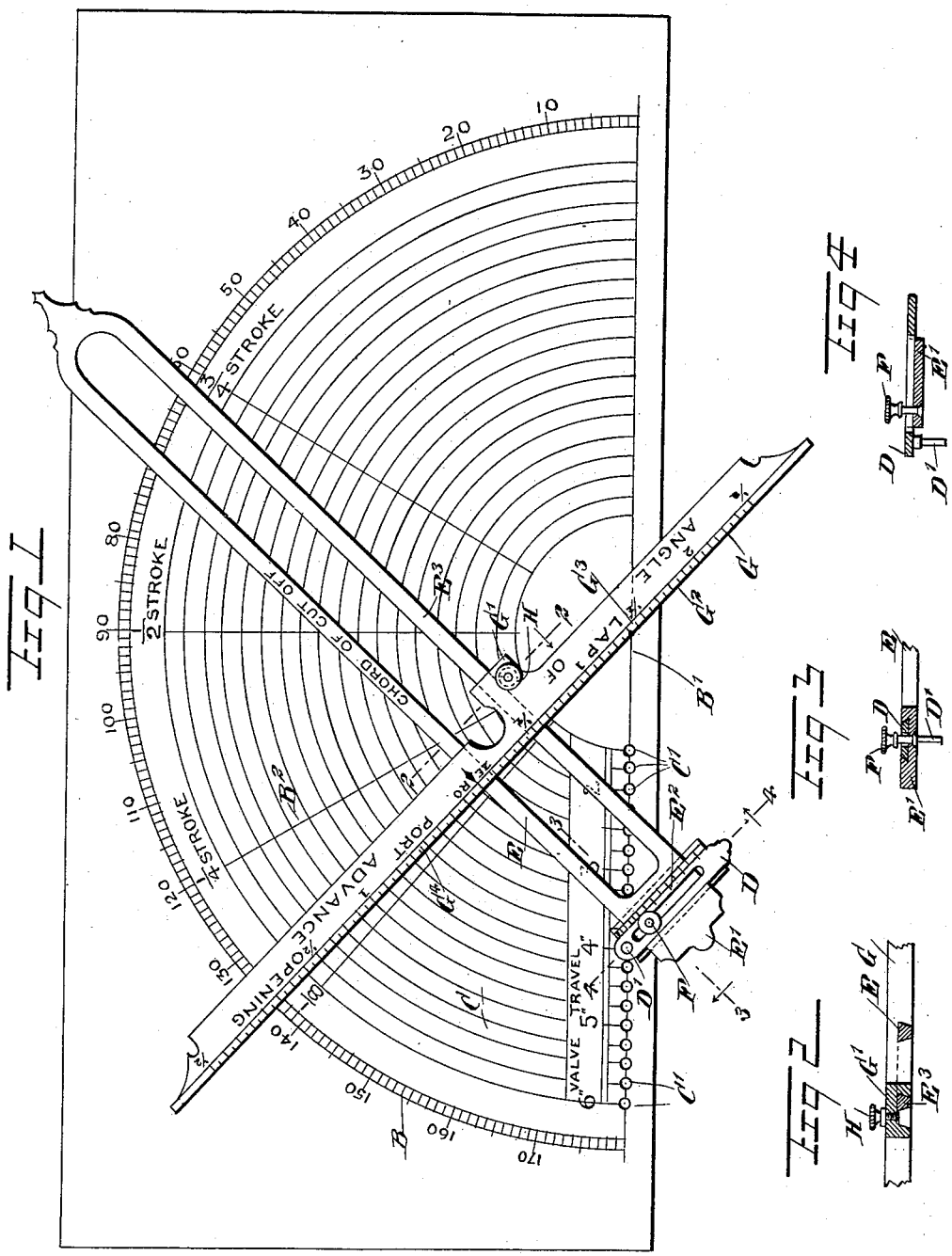
WITNESSES:
H Walker
Theo. G. Hoster
INVENTORS,
P. Ellis
A. A. Whitelaw
BY
ATTORNEYS

UNITED STATES PATENT OFFICE.

PETER ELLIS AND ARCHIBALD ALEXANDER WHITELAW, OF WELLINGTON, NEW ZEALAND.

MACHINE FOR MEASURING OR LAYING OUT SLIDE-VALVES.

SPECIFICATION forming part of Letters Patent No. 642,969, dated February 6, 1900.

Application filed May 5, 1899. Serial No. 715,688. (No model.)

*To all whom it may concern:*

Be it known that we, PETER ELLIS and ARCHIBALD ALEXANDER WHITELAW, subjects of the Queen of Great Britain, residing at Wellington, New Zealand, have invented a new and Improved Machine for Measuring or Laying Out Slide-Valves, of which the following is a full, clear, and exact description.

The object of the invention is to provide a new and improved device for laying out slide-valves of engines, and which is simple and durable in construction and easily manipulated to readily find without further calculation the angle of cut-off, the lead and the linear dimensions of ports, the lap, and the angle of advance of the eccentric.

The invention consists of novel features and parts and combinations of the same, as will be fully described hereinafter and then pointed out in the claims.

A practical embodiment of our invention is represented in the accompanying drawings, forming a part of this specification, in which similar characters of reference indicate corresponding parts in all the views.

Figure 1 is a plan view of the improvement. Fig. 2 is a transverse section of the same on the line 2 2 in Fig. 1. Fig. 3 is a sectional side elevation of the improvement on the line 3 3 in Fig. 1, and Fig. 4 is a transverse section of the same on the line 4 4 in Fig. 1.

The improved device has a plate A, made of sheet metal, cardboard, wood, or other suitable material and provided on its face with a protractor B, having a base-line B' and radial lines $B^2$ for indicating the degree of cut-off of the valve, as hereinafter more fully described. In the field of the protractor are arranged concentric semicircles C, terminating on one side of the base-line B' of the protractor in apertures C', placed such a distance apart as to represent the valve travel for different valves, the semicircles C representing the orbit of the various cranks. One of the apertures C' is adapted to be engaged at a time by a pin D', depending from a slide D, fitted to move transversely in one end E' of an index-bar E, provided with a graduation $E^2$, indicating the lap of the valve, the slide D and the end E' being adapted to be fastened together after the desired adjustment to the lap of a particular valve has been made by means of a clamping-screw F. (See Figs. 1, 3, and 4.)

The index-bar E is provided with a second parallel bar $E^3$, and on it is mounted to slide a head G, having a slide G', adapted to be fastened in place on the bar $E^3$ by a clamping-screw H to fasten the head G in position after the desired adjustment is made, as hereinafter more fully described. The head G extends at a right angle to the bar E and is provided with an edge $G^2$, having graduations $G^3$ $G^4$, of which the graduation $G^3$ reads from the outer edge of the bar G to indicate the linear measurement of the lap, and the graduation $G^4$ reads from the same point, but in an opposite direction, to indicate the linear measurement of the port-openings, it being understood that the zero-point for both graduations $G^3$ and $G^4$ coincides with the outer edge of the index-bar E.

The device is used as follows: The slide D is first adjusted on the bar E to the desired lap to be given to the valve and then the pin D' is inserted in the aperture C', indicating the intended slide-valve travel. The index-bar is now swung over the plate A until its edge indicates on the intersection of the semicircle C, leading from the pin D', having the radiating line $B^2$ of the desired stroke or degree of cut-off, and then the head G is adjusted on the bar E until its graduated edge $G^2$ extends through the center for the semicircle C. The distance from the zero-point of the graduation $G^3$ to the center of the semicircle gives the lap of the valve, and the distance from the zero-point on the graduation $G^4$ to the semicircle C, corresponding to the aperture in which the pin D' is inserted, indicates the port-opening. The edge $G^2$ also indicates on the indicator B the angle of advance of the eccentric. Thus, for instance, as shown in Fig. 1, the device is set for a valve having four-inch travel and a lead of three thirty-seconds of an inch, the cut-off being one-half stroke, the angle of advance of the eccentric one hundred and thirty-seven degrees, the lap barely one and three-eighths of an inch, and the port-opening five-eighths of an inch full.

From the foregoing it is evident that when the valve travel and the lead is given the other dimensions can be readily found without any further calculation whatever.

Having thus fully described our invention, we claim as new and desire to secure by Letters Patent—

1. A laying-out device for slide-valves, comprising a plate having curved lines representing orbits of various-sized cranks, and straight radiating lines representing degrees of cut-off, the orbit-lines terminating in a graduation representing the different travels of the valves, and a bar for application to the said plate to obtain the angle of cut-off, a slide transverse on the bar and arranged to swing on the plate, the slide having a graduation for indicating the lead, and a head transverse to the bar and fitted to slide longitudinally thereon, and formed with graduations representing the linear dimensions of ports and the lap, substantially as shown and described.

2. A laying-out device, comprising a plate, having a protractor and a series of apertures arranged in a straight radial line with respect thereto, a slide having a pin for engagement with one of the said apertures, to permit the slide to swing over the face of the plate, a bar on which the slide is mounted, and a graduated head transverse to the said bar and mounted to slide longitudinally thereon, substantially as shown and described.

3. A device of the class described, comprising a plate having a protractor and a series of apertures arranged radially with respect thereto, a slide adapted for pivotal engagement with any one of said apertures, a bar on which said slide is mounted to move transversely, and a graduated head extending transversely of the bar and mounted to slide thereon longitudinally.

4. A device of the class described, comprising a plate having a protractor with a series of radial lines, and a radial series of apertures with a graduation adjacent thereto, a slide adapted for pivotal engagement with any one of said apertures, a bar on which said slide is mounted to move transversely, and a graduated head extending transversely of the bar and mounted to slide thereon longitudinally.

PETER ELLIS.
ARCHIBALD ALEXANDER WHITELAW.

Witnesses:
JOHN DUNCAN,
J. E. DUNCAN.